United States Patent
Kerner et al.

(10) Patent No.: US 10,523,937 B2
(45) Date of Patent: Dec. 31, 2019

(54) METHOD FOR NOISE SHAPING AND A NOISE SHAPING FILTER

(71) Applicants: Michael Kerner, Tel Mond (IL); Nati Dinur, Haifa (IL); Assaf Gurevitz, Ramat Hasharon (IL)

(72) Inventors: Michael Kerner, Tel Mond (IL); Nati Dinur, Haifa (IL); Assaf Gurevitz, Ramat Hasharon (IL)

(73) Assignee: Intel Corporation, Santa Clara, CA (US)

(*) Notice: Subject to any disclaimer, the term of this patent is extended or adjusted under 35 U.S.C. 154(b) by 1504 days.

(21) Appl. No.: 13/946,457

(22) Filed: Jul. 19, 2013

(65) Prior Publication Data
US 2015/0023415 A1    Jan. 22, 2015

(51) Int. Cl.
*H04N 19/117* (2014.01)
*H04N 19/126* (2014.01)
*H04N 19/154* (2014.01)

(52) U.S. Cl.
CPC ......... *H04N 19/117* (2014.11); *H04N 19/126* (2014.11); *H04N 19/154* (2014.11)

(58) Field of Classification Search
None
See application file for complete search history.

(56) References Cited

U.S. PATENT DOCUMENTS

| | | | | |
|---|---|---|---|---|
| 5,565,930 A * | 10/1996 | Bolger | ............. | H04L 27/22 348/125 |
| 7,432,841 B1 * | 10/2008 | Kinyua | ............. | H03M 3/414 341/143 |
| 2006/0088222 A1 * | 4/2006 | Han | ............. | H04N 19/00 382/232 |
| 2007/0009026 A1 * | 1/2007 | Kwon | ............. | H04N 19/176 375/240.03 |

FOREIGN PATENT DOCUMENTS

| | | |
|---|---|---|
| CN | 1893657 A | 1/2007 |
| CN | 102334294 A | 1/2012 |
| DE | 69107155 T2 | 5/1995 |

OTHER PUBLICATIONS

E. Janssen, A. van Roermund, "Look-Ahead Sigma-Delta Modulation", Analog Circuits and Signal Processing 2011, pp. 49-75.
Noise shaping (http://en.wikipedia.org/wiki/Noise_shaping).
Office Action dated Dec. 14, 2016 for Chinese Patent Application No. 201410445258.2.
Office Action dated Mar. 15, 2017 for German Patent Application No. 102014109622.3.
Office Action dated Sep. 30, 2017 for Chinese Patent Application No. 201410445258.2.

* cited by examiner

*Primary Examiner* — Mikhail Itskovich
(74) *Attorney, Agent, or Firm* — Schiff Hardin LP

(57) ABSTRACT

A method for noise shaping includes: reducing a bit-depth of an input signal to obtain a quantized input signal; feeding a quantization error corresponding to the bit-depth reduction (Continued)

of the input signal into a feedback loop to the input signal, the feedback loop comprising a first quantization stage, a second quantization stage and a correction stage, both the first and second quantization stages operating at the bit-depth of the input signal and the correction stage operating at a bit-depth of the quantization error; and generating a noise-shaped output signal at lower clock rate than the input signal based on the feedback loop.

27 Claims, 9 Drawing Sheets

METHOD FOR NOISE SHAPING AND A NOISE SHAPING FILTER

TECHNICAL FIELD

The disclosure relates in general to noise shaping and in particular to a method for noise shaping, a noise shaping filter and a noise shaper.

BACKGROUND

Noise shaping is a technique typically used in digital audio, image, and video processing, as part of the process of noise reduction or quantization of a digital signal. Its purpose is to increase the apparent signal to noise ratio of the resultant signal. It can be implemented by altering the spectral shape of the error introduced by quantization in such a way that the noise power is at a lower level in frequency bands at which noise is perceived to be more undesirable and at a correspondingly higher level in bands where it is perceived to be less undesirable. Because noise shaping is a feed-back structure, pipelining of operations is not possible and all results should be ready within a single clock cycle. From this reason, implementation at the half sampling rate requires increasing the hardware by a factor of four, i.e. two units are needed where every unit contains the double hardware. The cost of this so called "look ahead" approach is an enormous hardware complexity.

BRIEF DESCRIPTION OF THE DRAWINGS

The accompanying drawings are included to provide a further understanding of aspects of the disclosure and are incorporated in and constitute a part of this specification. The drawings illustrate aspects and together with the description serve to explain principles of aspects. Other aspects and examples and many of the intended advantages of aspects and examples will be readily appreciated as they become better understood by reference to the following detailed description. Like reference numerals designate corresponding similar parts.

DETAILED DESCRIPTION

Figure 1:
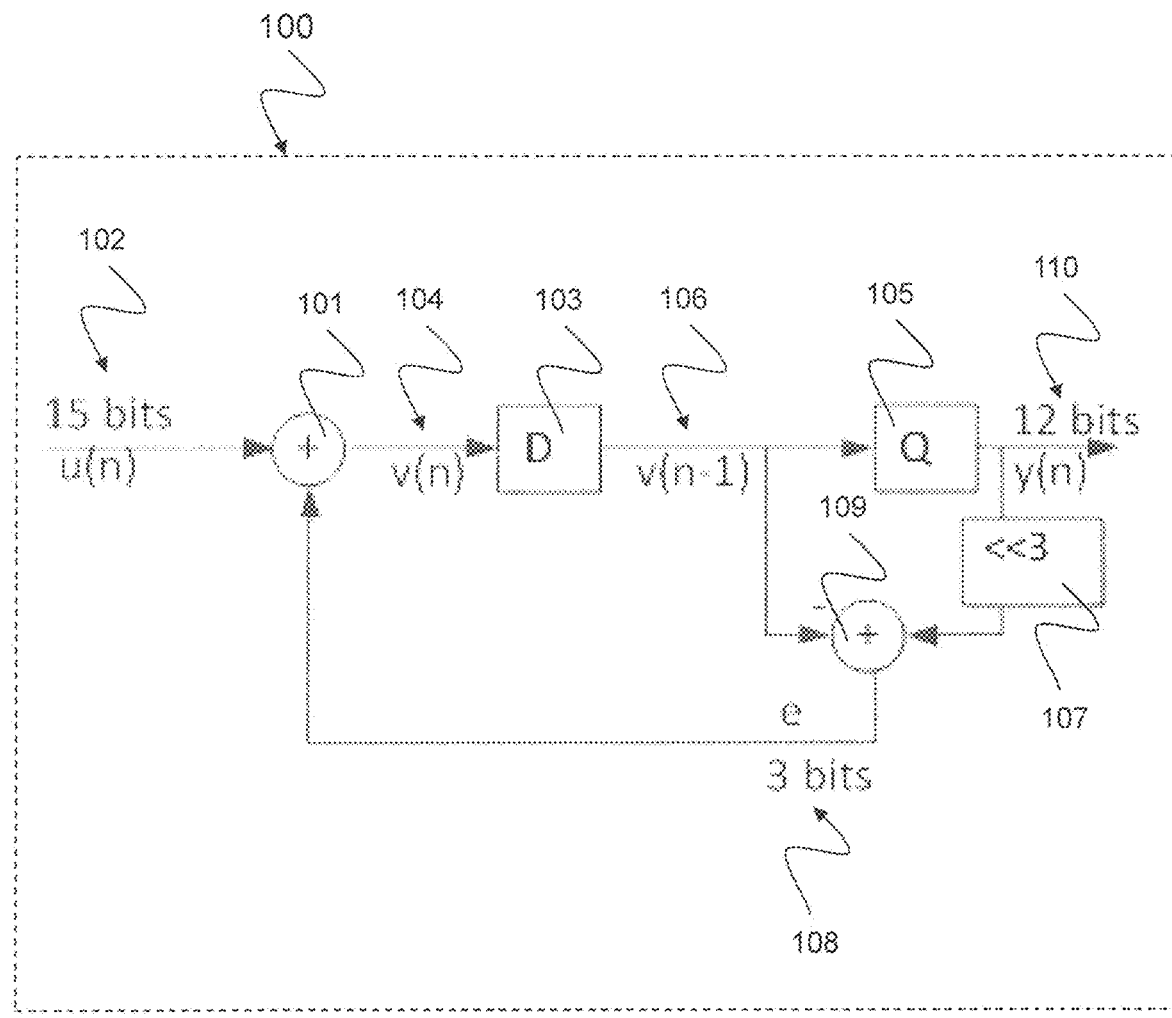
FIG. 1 illustrates an example of a noise shaping filter 100 applying the additive property.

The aspects and examples are described with reference to the drawings, wherein like reference numerals are generally utilized to refer to like elements throughout. In the following description, for purposes of explanation, numerous specific details are set forth in order to provide a thorough understanding of one or more aspects or examples. It may be evident, however, to one skilled in the art that one or more aspects or examples may be practiced with a lesser degree of the specific details. In other instances, known structures and elements are shown in schematic form in order to facilitate describing one or more aspects or examples. It is to be understood that other examples may be utilized and structural or logical changes may be made without departing from the scope of the disclosure.

In addition, while a particular feature or aspect of an example may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present disclosure is defined by the appended claims.

The devices and methods as described herein can be utilized as part of and for radio transmission systems, e.g. for systems operating in the OFDM mode. The devices disclosed may be embodied in baseband segments of devices used for the transmission or reception of radio signals, in particular base stations, relay stations, mobile phones, handheld devices or other kinds of mobile radio receivers. The described devices may be employed to perform methods as disclosed herein, although those methods may be performed in any other way as well.

The following description may be read in connection with any kind of multiple carrier radio transmission systems, in particular any mobile communications systems employing multiple carrier modulation, such as, for example, the Universal Mobile Telecommunications System (UMTS) Standard or the Long Term Evolution (LTE) Standard. The following description may also be read in connection with multiple carrier radio transmission systems in the field of digital video broadcasting (DVB-T/H) which is based on terrestrial transmitters and a communication system design adapted for mobile or hand-held receivers. However, also other communications systems, for example, satellite systems or digital subscriber line (DSL) systems, may benefit from the concepts and principles outlined herein. The methods and devices as described herein may be utilized with any sort of WiFi transmitter or receiver, i.e. in electronic devices exchanging data wirelessly (using radio waves) over a computer network that may include high-speed Internet connections.

The methods and devices as described herein may be utilized with any sort of antenna configurations employed within the multiple carrier radio transmission system as described herein. In particular, the concepts presented herein are applicable to radio systems employing an arbitrary number of transmit and/or receive antennas, that is Single Input Single Output (SISO) systems, Single Input Multiple Output (SIMO) systems, Multiple Input Single Output (MISO) systems and Multiple Input Multiple Output (MIMO) systems.

In the following, quantization stages, quantization errors and bit-depth reduction are described. Quantization is the process of mapping a large set of input values to a smaller set such as rounding values to some unit of precision, e.g. by reducing a bit-depth of the input values. A device or a stage that performs quantization is called a quantizer. The round-off error introduced by quantization is referred to as quantization error. In analog-to-digital conversion, the difference between the actual analog value and quantized digital value is called quantization error or quantization distortion. This error is either due to rounding or truncation. The error signal is sometimes considered as an additional random signal called quantization noise because of its stochastic behavior. Quantization is involved to some degree in nearly all digital signal processing, as the process of representing a signal in digital form ordinarily involves rounding.

The methods and devices as described herein may be utilized with any sort of digital-to-analog converter (DAC), i.e. devices that convert a digital (e.g. binary) code to an analog signal, such as a current, a voltage, or an electric charge. The methods and devices as described herein may be utilized with any sort of analog-to-digital converter (ADC), i.e. devices that perform the reverse operation.

The methods and devices as described herein may be utilized with any kind of delta-sigma (ÄÓ; or sigma-delta, ÓÄ) modulation, i.e. methods for encoding analog signals into digital signals or higher-resolution digital signals into lower-resolution digital signals. In delta-sigma modulation, the conversion is done by using error feedback, where the difference between the two signals is measured and used to improve the conversion. The low-resolution signal typically changes more quickly than the high-resolution signal and it can be filtered to recover the high-resolution signal with little or no loss of fidelity. Both ADCs and DACs can employ delta-sigma modulation. A delta-sigma ADC first encodes an analog signal using delta-sigma modulation and then applies a digital filter to form a higher-resolution digital output. On the other hand, a delta-sigma DAC encodes a high-resolution digital input signal into a lower-resolution signal that is mapped to voltages and then smoothed with an analog filter. In both cases, the temporary use of a lower-resolution signal simplifies circuit design and improves efficiency. In both cases, the methods and devices as described below can be utilized for reducing the computational complexity.

The methods and devices as described herein may be utilized with any kind of look-ahead sigma-delta modulator (SDM) where the shaping of noise is implemented by an error minimizing feedback loop in which the input signal is compared with the quantized output signal and the difference between these two signals is frequency weighted with the loop filter. The methods and devices as described herein may further be utilized with any kind of look-ahead analog-to-digital converter (ADC). In such look-ahead ADC the shaping of noise may be implemented similar to the SDM but since in an ADC the input signal is in analog form, the feedback loop may be implemented by using a delay line and re-sampling the input signal n-times.

Figure 4:
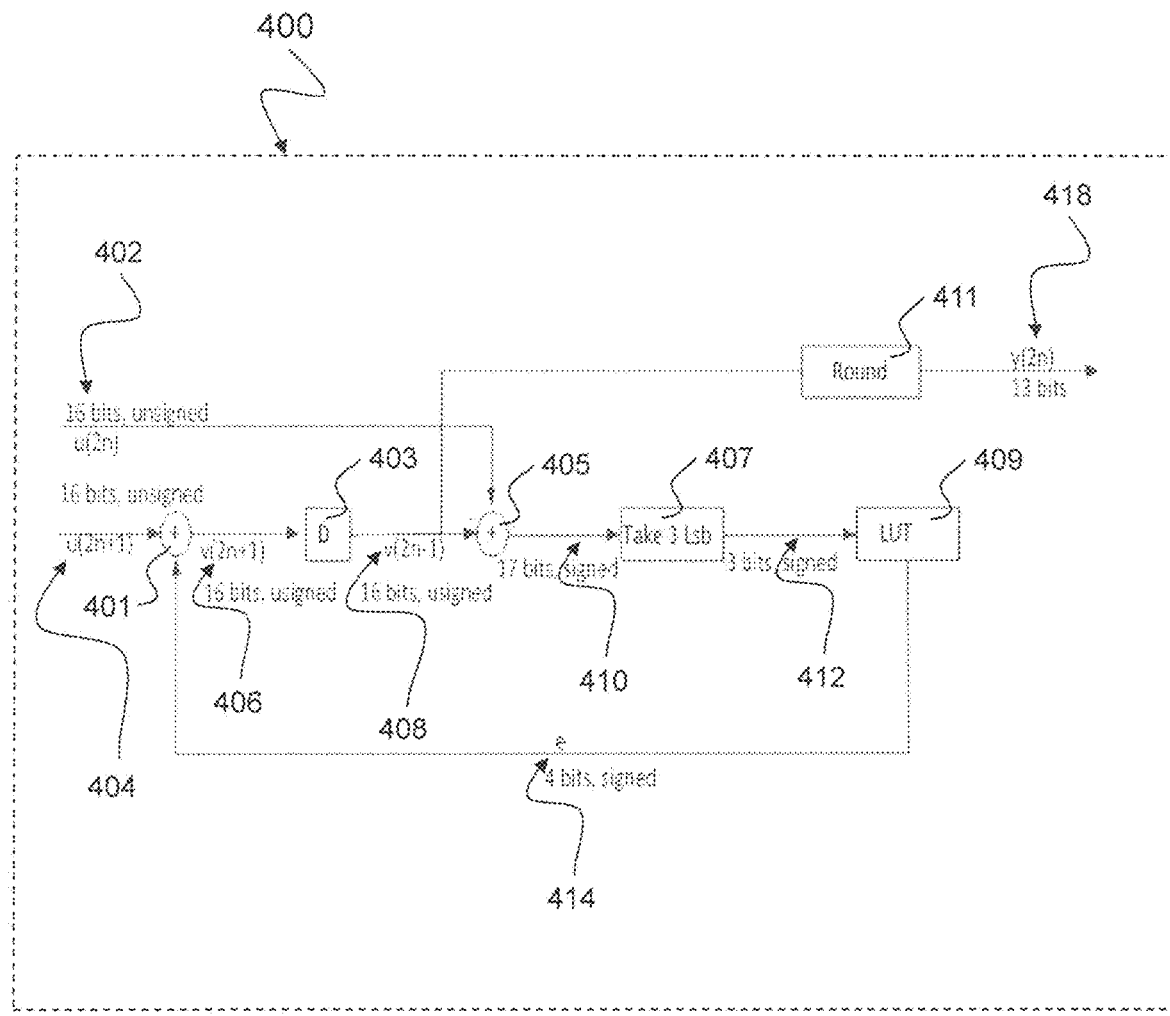
FIG. 4 illustrates an example of a noise shaping filter sub-block 400 implemented at half clock.
Figure 5:
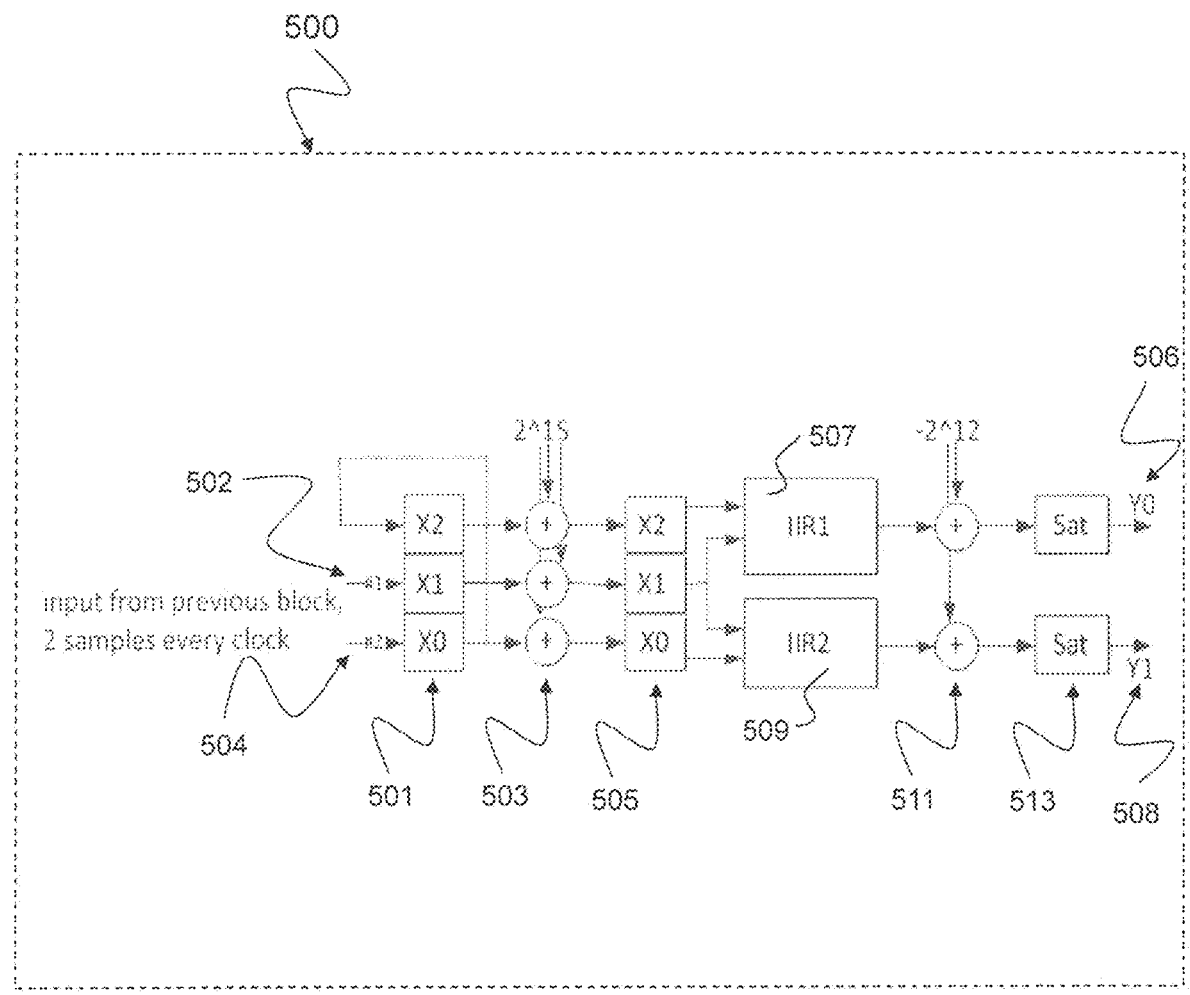
FIG. 5 illustrates an exemplary noise shaping filter 500 including two noise shaping filter sub-blocks as depicted in FIG. 4 implemented at half clock.
Figure 6:
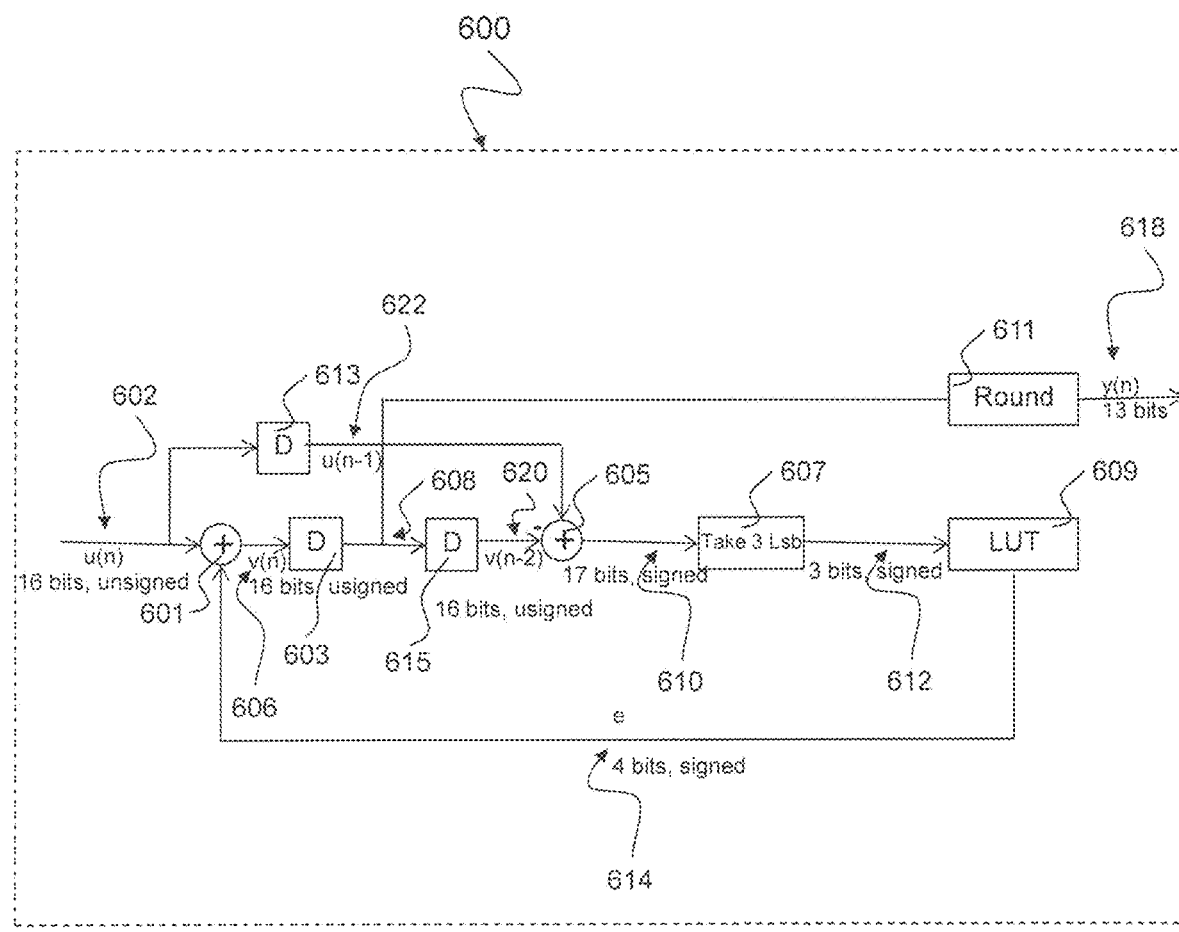
FIG. 6 illustrates an example of a noise shaping filter sub-block 600 in a pipeline-baseline implementation.
Figure 7:
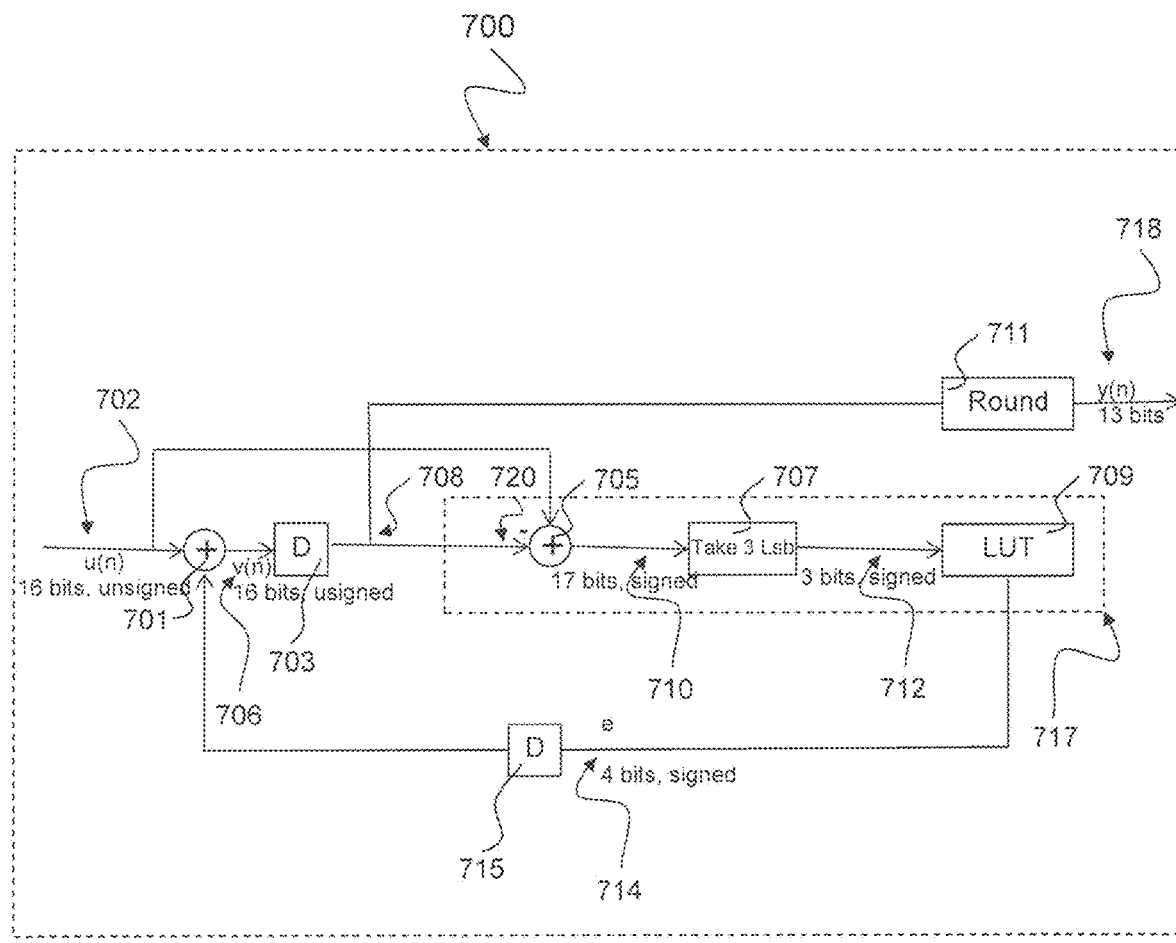
FIG. 7 illustrates an example of a noise shaping filter sub-block 700 in a pipeline-modified implementation.

The methods and devices as described herein may be used by chip makers for signal/audio/video processing in order to reduce the hardware complexity of the noise shaping part. The methods and devices as described herein may be used in hardware and software architectures that enable pipelining for improving the processing flow. The methods and devices as described herein may be used for a specific family of noise shaping filters that uses rounding or bit depth reduction in the feedback. For this family, four exemplary implementations are described below with respect to FIGS. 4 to 7. The first exemplary implementation described below with respect to FIG. 4 is a half sampling frequency implementation. The second exemplary implementation described below with respect to FIG. 5 is a half sampling frequency implementation which shows only the cost of doubling the hardware (HW). The third and fourth exemplary implementations described below with respect to FIGS. 6 and 7 are implementations by pipeline. The third implementation of FIG. 6 shows a baseline implementation by pipeline, i.e. a straightforward implementation of the filtering equation (11) described below. The fourth implementation of FIG. 7 shows a modified implementation by pipeline where delay blocks are moved in such a way that the number of calculations on the critical path is reduced.

The methods and devices as described herein may be used for any noise shaping schemes. Noise shaping works by putting the quantization error in a feedback loop. Any feedback loop functions as a filter, so by creating a feedback loop for the error itself, the error can be filtered as desired. The simplest example would be $$y[n]=u[n]+e[n-1]=u[n]+\text{round}(y[n-1])-u[n-1], \quad (1)$$

where y is the output sample value that is to be quantized, u is the input sample value, n is the sample number, and e is the quantization error made at sample n (error when quantizing y[n]). This formula can also be read: The output sample is equal to the input sample plus the quantization error on previous sample.

Methods and devices as described herein may be used for noise shaping filters with the specific form denoted herein as the general noise shaping form:

$$y[n] = u[n] + \sum_i Ai \cdot e[n-i] = \quad (2)$$
$$u[n] + \text{round}\left(\sum_i Ai \cdot y[n-i]\right) - Ai \cdot u[n-i]),$$

in particular the general noise shaping form with the constraint that real part of Ai and imaginary part of Ai are integers. Round( ) denotes here the mathematical rounding function. For such filters, methods and devices as described herein enable pipeline implementation and/or implementation at half sampling frequency by only cost of doubling the hardware.

The methods and devices as described herein may be used for general feedback noise filters enabling the use of pipelining.

Methods and devices as described herein may be based on the "additive property" as described in the following (for simplicity reasons the case is considered in which Ai=1). For two real numbers a1 and a2, such that: a2>abs (a1) where abs denotes absolute value, the additive property can be written as:

$$\text{round}(a1+\text{round}(a2))=\text{round}(a1)+\text{round}(a2)+\text{delta}(a1), \quad (3)$$

where delta(a1)=1 if a1<0 and a1 has a fractional part equal to 0.5 (e.g. a1=−0.5, a1=−1.5, a1=−2.5 and so on); otherwise delta(a1)=0;

The additive property can be illustrated by the following examples.

First Example: round(−0.3+round(5.2))=5; round(−0.3)+round(5.2)+delta(−0.3)=0+5+0=5(delta(a1)=0).

Second Example: round(0.5+round(5.2))=6; round(0.5)+round(5.2)+delta(0.5)=1+5+0=6(delta(a1)=0).
Third Example: round(−0.5+round(5.2))=5; round(−0.5)+round(5.2)+delta(−0.5)=−1+5+1=5(delta(a1)=1).

In these examples, round( ) denotes the mathematical rounding function. Rounding a numerical value means replacing it by another value that is approximately equal but has a shorter, simpler, or more explicit representation. Rounding can be a rounding to the nearest integer, for example: round(4.3)=4; round(4.5)=5; round(4.8)=5; round (−4.3)=−4; round(−4.5)=−5; round(−4.8)=−5). In other examples, round( ) may denote other round definitions, for example as defined in table 1 below. The "additive property" according to equation (3), however, holds for the rounding to nearest integer and will not hold for other rounding definitions from table 1. For such other rounding definitions, other "additive properties" different from equation (3) may be derived.

TABLE 1 exemplary definitions of the round function

| Y | round down (towards −∞) | round up (towards +∞) | round towards zero | round away from zero | round to nearest |
|---|---|---|---|---|---|
| +23.67 | +23 | +24 | +23 | +24 | +24 |
| +23.50 | +23 | +24 | +23 | +24 | +24 |
| +23.35 | +23 | +24 | +23 | +24 | +23 |
| +23.00 | +23 | +23 | +23 | +23 | +23 |
| 0 | 0 | 0 | 0 | 0 | 0 |
| −23.00 | −23 | −23 | −23 | −23 | −23 |
| −23.35 | −24 | −23 | −23 | −24 | −23 |
| −23.50 | −24 | −23 | −23 | −24 | −24 |
| −23.67 | −24 | −23 | −23 | −24 | −24 |

By analogy, the same property exists for bit-depth reduction where this operation can be defined as $Q(x)=\text{round}(x/2^k)$, where x is an integer number and k is an integer positive number. In the following description, k is assumed to be 3 and $2^k$ is assumed to be 8, i.e. $Q(x)=\text{round}(x/8)$. However, any other value can be chosen for k, e.g. a value such as 1, 2, 4, 5, 6, 7, 8, 9, 10, 11, 12, 13, 14, 15, 16 or higher. In this case where k=3, a1 and a2 are integers, such that: a2>abs(a1), where abs( ) denotes the absolute value, and the additive property can be written as:

$$Q(a1+Q(a2))=Q(a1)+Q(a2)+\text{delta}(a1), \qquad (4)$$

where: delta(a1)=1 if a1<0 and a1 mod 8=4 (8×0.5=4), e.g. a1=−4, −12, −20 and so on; otherwise delta(a1)=0.

Referring to FIG. 1, an example of a noise shaping filter 100 applying the additive property as describe above is shown. The noise shaping filter 100 receives an input u(n) 102 having a bit-depth of 15 bits and generates an output y(n) 110 having a bit-depth of 12 bits, i.e. reduced by k=3 bits with respect to the input 102. As mentioned above, any other value for k can be realized. The value k=3 is used here as an exemplary value due to simplification reasons. An error e(n−1) 108 having a bit-depth of 3 bits is fed back to an adder 101 adding the input u(n) to the error e(n−1) obtaining an internal value v(n) 104 which is passed through a delay unit "D" 103 to obtain the delayed internal value v(n−1) 106. The output y(n) is obtained by passing the delayed internal value v(n−1) through a quantizer "Q" 105 performing a quantizing operation with respect to the delayed internal value v(n−1). The quantizing operation may be a bit-depth reduction or a rounding operation as described above, e.g. a bit-depth reduction by 3 bits according to $Q(x)=\text{round}(x/8)$. The error e(n−1) 108 is obtained by left-shifting the output y(n) obtaining a shifted output with a bit-depth of 15 bits and subtracting the delayed internal value v(n−1) from that shifted output. The shifting operation may be performed by using a shifting unit 107 and the subtraction may be performed by using an adding unit 109 with inverse input for the delayed internal value v(n−1).

Figure 2:
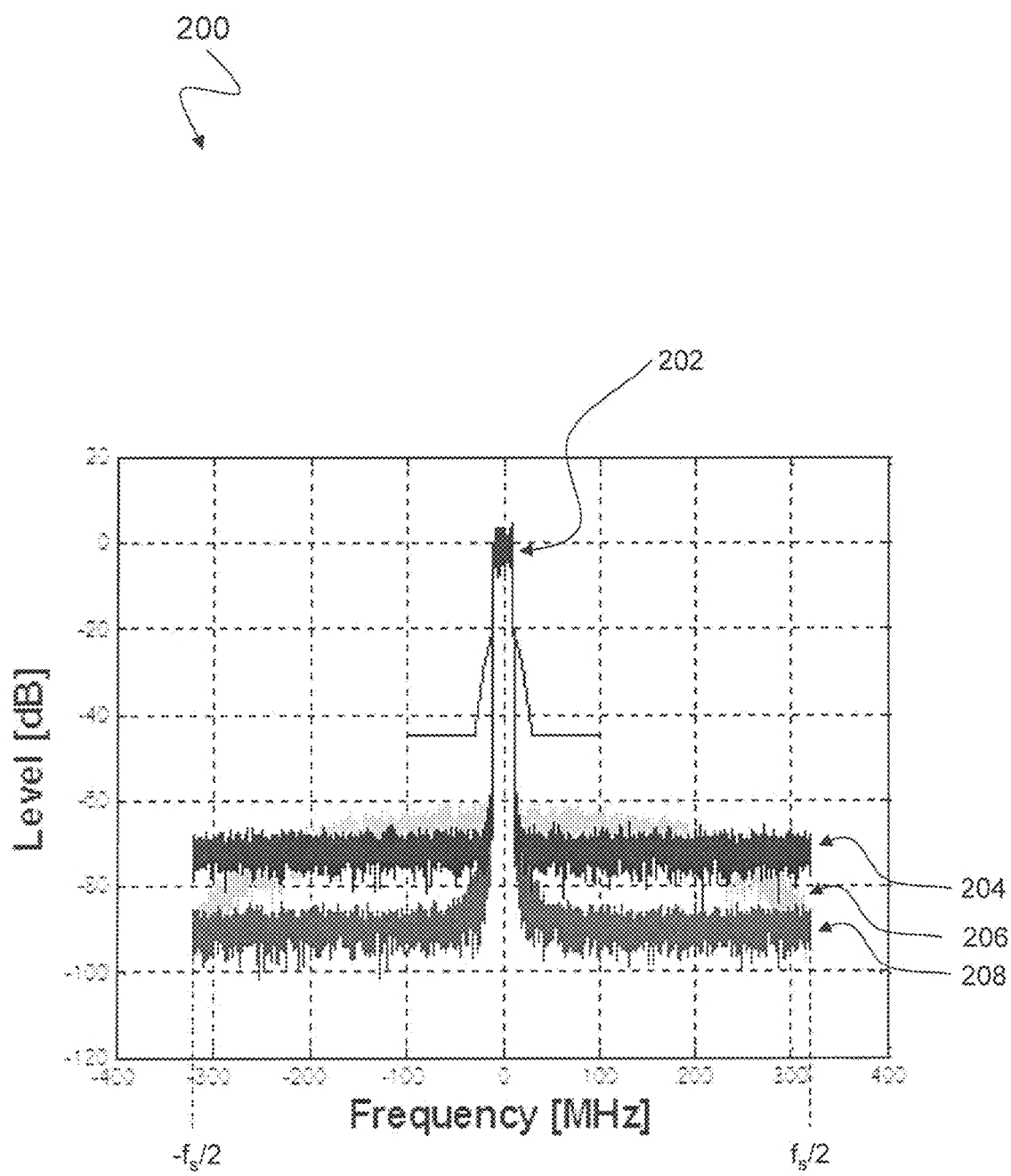
FIG. 2 illustrates an exemplary spectrum 200 of a signal and quantization noise after bit depth reduction with noise shaping.

This system may reduce the bit-depth of the input signal 102 from 15 bits to 12 bits, while keeping the quantization noise at the edges near the half sampling frequency Fs/2 unchanged, with a tradeoff of increasing the quantization noise near DC frequency by about 6 dB compared to the noise level of a 12 bits signal according to the illustration of FIG. 2 where the curve 206 illustrates the noise shaping effects versus curve 208 illustrating the spectrum of signal (15 bits) and quantization noise and curve 204 illustrating the spectrum of signal (12 bits) and quantization noise after straightforward bit depth reduction from 15 to 12 bits.

The noise shaping filter 100 illustrated in FIG. 1 can be described by the following equations:

$$v(n)=Q[v(n-1)]-v(n-1)+u(n), \qquad (5)$$

$$v(n)=-v(n-1)+Q[v(n-1)]+u(n), \qquad (6)$$

$$y(n)=Q[v(n-1)], \qquad (7)$$

where v(n) denotes a function of v(n−1) or alternatively (using equation 7), y(n) depends on y(n−1). In order to allow pipeline or implementation at half clock, y(n) should depend on y(n−2) (or y(n+1) should depend on y(n−1)).

By applying the "additive property" as defined above to the noise shaping filter 100, the implementation of that filter 100 can be significantly simplified allowing an implementation in a pipeline and/or a half clock architecture. In particular, the following operations can be applied to the filter 100:

Replacing n by n+1 in Equation (6) results in:

$$v(n+1)=-v(n)+Q[v(n)]+u(n+1). \qquad (8)$$

By substituting equation (5) to equation (8), the following equation (9) is obtained:

$$v(n+1) = v(n-1) - Q[v(n-1)] - u(n) + \qquad (9)$$
$$Q\{-v(n-1) + Q[v(n-1)] + u(n)\} + u(n+1).$$

Using the "additive property" as defined above with respect to equation (4) according to $Q\{a1+Q[a2]\}=Q[a1]+Q[a2]+\text{delta}(a1)$ results in:

$$v(n+1) = v(n-1) - Q[v(n-1)] - u(n) + Q[v(n-1)] + \qquad (10)$$
$$Q[u(n) - v(n-1)] + u(n+1) + \text{delta}(u(n) - v(n-1))$$

and $$v(n+1) = v(n-1) - u(n) + \qquad (11)$$
$$Q[u(n) - v(n-1)] + u(n+1) + \text{delta}(u(n) - v(n-1))$$

Equation (12) is as defined above with respect to equation (7):

$$y(n)=Q[v(n-1)]. \qquad (12)$$

From equations (10), (11) and (12) it can be seen that v(n+1) depends on v(n−1), or y(n+1) depends on y(n−1). That means that the implementation of the noise shaping filter 100 as depicted in FIG. 1 can be pipelined by applying the additive property as defined in equation (4).

Referring to FIG. 2, an exemplary spectrum of a signal and quantization noise after a bit depth reduction with a noise shaping filter as depicted in FIG. 1 is shown.

The section 202 of the three curves 204, 206, 208 represents the signal level in a range around the DC frequency. The first curve 208 illustrates the spectrum of signal (15 bits) and quantization noise without bit depth reduction. The second curve 204 illustrates the spectrum of signal (12 bits) and quantization noise after a straightforward bit depth reduction from 15 to 12 bits. The third curve 206 illustrates the spectrum of signal (12 bits) and quantization noise after a bit depth reduction from 15 to 12 bits with noise shaping using a noise shaping filter 100 as described above with respect to FIG. 1.

By using a noise shaping filter 100 as described above with respect to FIG. 1, the system may reduce the bit-depth of the input signal from 15 bits to 12 bits, while keeping the quantization noise at the edges near the half sampling frequency fs/2 unchanged, with a tradeoff of increasing the quantization noise near DC frequency by about 6 dB compared to the noise level of a 12 bits signal. That means, each bit of signal bit-depth reduction may reduce the noise level at the spectrum edges (−fs/2 and fs/2) by about 6 dB. FIG. 2 illustrates the case of k=3, i.e. 3 bit bit-depth reduction according to a total reduction of about 18 dB.

Figure 3:
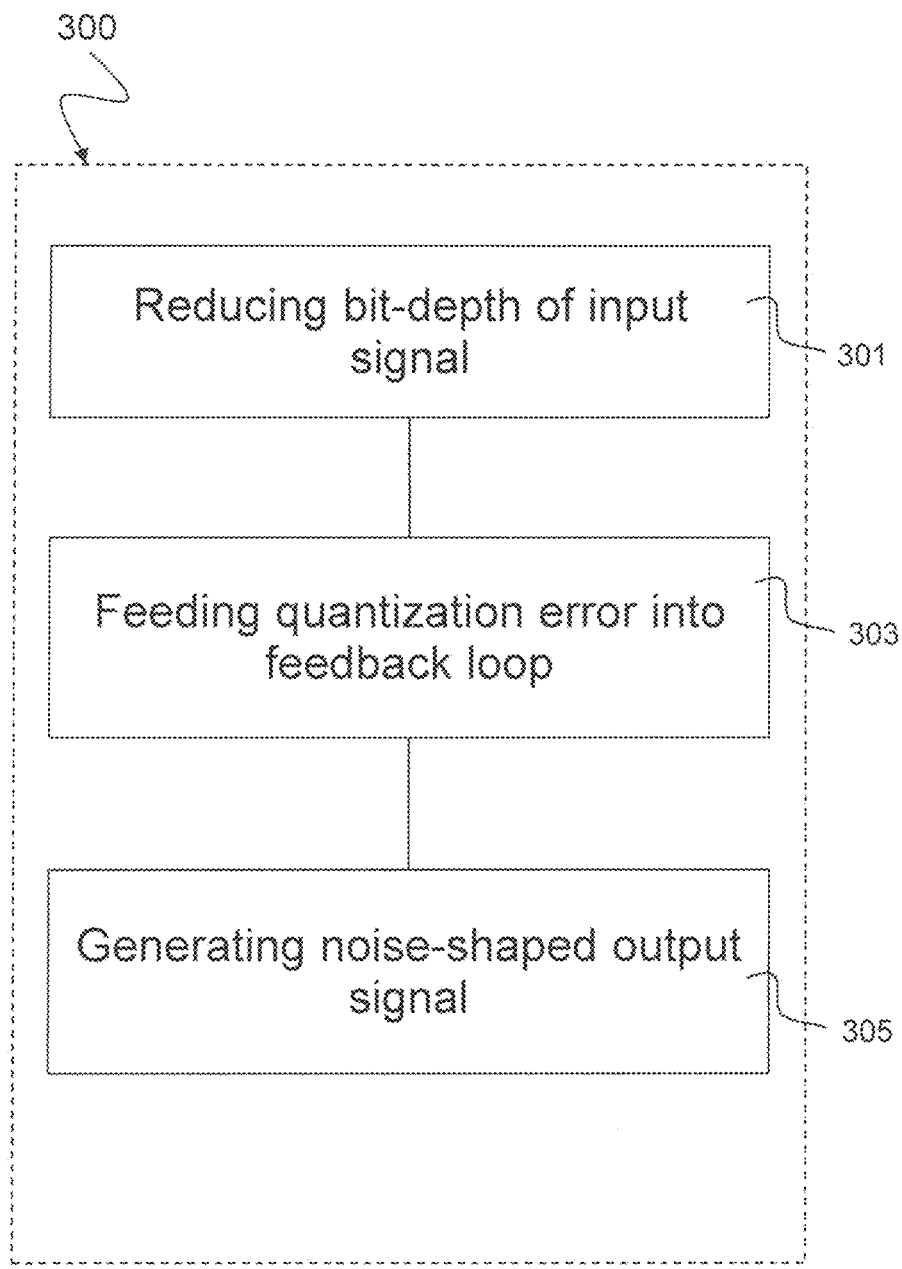
FIG. 3 illustrates an example of a method 300 for noise shaping.

Referring to FIG. 3, an example of a method 300 for noise shaping is shown. By using the additive property described by equation (4), the filtering operations of the noise shaping filter 100 described above with respect to FIG. 1 can be expressed as a method as described in the following.

A method 300 for noise shaping includes: reducing 301 a bit-depth of an input signal to obtain a quantized input signal. A method 300 for noise shaping further includes: feeding 303 a quantization error corresponding to the bit-depth reduction of the input signal into a feedback loop to the input signal, the feedback loop comprising a first quantization stage, a second quantization stage and a correction stage, both the first and second quantization stages operating at the bit-depth of the input signal and the correction stage operating at a bit-depth of the quantization error. A method 300 for noise shaping further includes: generating 305 a noise-shaped output signal at lower clock rate than the input signal based on the feedback loop.

In an implementation of the method 300, a bit-depth reduction of the first quantization stage corresponds to a bit-depth reduction of the second quantization stage. In an implementation of the method 300, the method further includes: reducing a bit-depth of an input to the first quantization stage to a bit-depth of the quantization error when passing the input through the first quantization stage. In an implementation of the method 300, an input to the first quantization stage corresponds to an input to the correction stage. In an implementation of the method 300, an input to the second quantization stage is different from an input to the correction stage. In an implementation of the method 300, the method 300 further includes: using an additive property for the combination of the first and second quantization stages and the correction stage. In an implementation of the method 300, the additive property is according to the following: $Q(a1+Q(a2))=Q(a1)+Q(a2)+\text{delta}(a1)$, where $Q(a1)$ denotes the first quantization stage, $Q(a2)$ denotes the second quantization stage, delta$(a1)$ denotes the correction stage, $a1$ denotes an input to both the first quantization stage and the correction stage and $a2$ denotes an input to the second quantization stage.

In an implementation of the method 300, the correction stage output a one if an input to the correction stage is smaller than zero and a fractional part of that input corresponds to two to the half bit-depth of the quantization error and otherwise outputs a zero. In an implementation of the method 300, the method 300 further includes: determining the fractional part of the input of the correction stage by applying a modulo operation to the input of the correction stage, the modulo operation with respect to two to the bit-depth of the quantization error. In an implementation of the method 300, the method 300 further includes: implementing the combination of the first quantization stage and the correction stage based on a lookup table. In an implementation of the method 300, a size of the lookup table corresponds to two to a bit-depth of the quantization error. In an implementation of the method 300, a bit-depth of an output of the lookup table is by one bit greater than a bit-depth of an input to the lookup table. In an implementation of the method 300, the feedback loop comprises a filtering of the quantization error with filter coefficients whose real and imaginary parts are integers.

Referring to FIG. 4, an example of a noise shaping filter sub-block 400 implemented at half clock is shown where a clock of half the sampling frequency (clock=½Fs) may be used.

The filter sub-block 400 receives a first sample u(2n) 402 and a second sample u(2n+1) 404 of an input signal. Both samples 402, 404 of the input signal have a bit-depth of 16 bits and are received as unsigned values. The filter sub-block 400 provides one sample y(2n) 418 of an output signal having a bit-depth of 13 bits, i.e. reduced by k=3 bits with respect to the input signal. As mentioned above, any other value for k can be realized. The value k=3 is used here as an exemplary value due to simplification reasons. A signed error signal e 414 having a bit-depth of 4 bits is fed back to an adder 401 adding the second sample u(2n+1) of the input signal to the error signal e 414 obtaining an internal value v(2n+1) 406 which is passed through a delay unit "D" 403 to obtain the delayed internal value v(2n−1) 408. The output signal y(2n) 418 is obtained by passing the delayed internal value v(2n−1) through a quantizer "Q" 411 (also denoted as round unit) performing a quantizing operation with respect to the delayed internal value v(2n−1). The quantizing operation may be a bit-depth reduction or a rounding operation as described above, e.g. a bit-depth reduction by 3 bits according to $Q(x)=\text{round}(x/8)$.

The error e 414 is obtained by passing the 3 least significant bits 412 of a second internal value 410 through a lookup table, e.g. a lookup table according to table 2 described below. The second internal value 410 which may be a signed value of a bit-depth of 17 bits can be obtained by subtracting the delayed internal value v(2n−1) from the first sample u(2n) 402 of the input signal. An adding unit 405 with an inverse input for the delayed internal value v(2n−1) can be used for implementing the subtraction. A bit shifter 407 can be used for taking the 3 least significant bits of the second internal value 410. These 3 least significant bits may represent a signed 3 bit-value 410.

The noise shaping filter sub-block 400 may reduce the bit-depth of the input signal 404, 404 from 16 bits unsigned to 13 bits unsigned, while keeping the quantization noise at the edges near the half sampling frequency Fs/2 unchanged, with a tradeoff of increasing the quantization noise near DC frequency by about 6 dB compared to the noise level of a 13 bits unsigned signal.

The filter sub-block 400 can be derived by replacing n in equation (11) described above with respect to FIG. 1 by 2k−1 with k=1, 2, . . . obtaining $$v(2k) = v(2k-2) - u(2k-1) + \\ Q[u(2k-1) - v(2k-2)] + u(2k) + \text{delta}(u(2k-1) - v(2k-2)) \quad (13)$$

and by replacing n by 2k with k=1, 2, . . . obtaining $$v(2k+1) = v(2k-1) - u(2k) + \\ Q[u(2k) - v(2k-1)] + u(2k+1) + \text{delta}(u(2k) - v(2k-1)). \quad (14)$$

The term Q[u(2k−1)−v(2k−2)]−u(2k−1)+v(2k−2)+delta(u(2k−1)−v(2k−2)) of equation (13) corresponding to Q[a]−a+delta(a) can be implemented by a simple look up table, e.g. a lookup table as illustrated in table 2. It can be shown that the expression Q[a]−a+delta(a)=round(a/8)*8−a+delta(a) can be simplified according to the relation:

delta($a$)=8 if $a$<0 and (31$sb$=100);

delta($a$)=0 otherwise. (15)

The simplification of equation (15) shows that it is sufficient to look on the three least significant bits of a, i.e. 31sb.

TABLE 2 lookup table implemented in the noise shaping filter sub-block 400

| Input:<br>a(lsb) | Output in decimal:<br>round(a/8)*8 − a | Output:<br>Result |
|---|---|---|
| 000 | 0 | 0000 |
| 001 | −1 | 1111 |
| 010 | −2 | 1110 |
| 011 | −3 | 1101 |
| 100 | 4(a >= 0) or<br>−4 (a < 0) + 8(a < 0) | 0100 |
| 101 | 3 | 0011 |
| 110 | 2 | 0010 |
| 111 | 1 | 0001 |

The noise shaping filter sub-block 400 can also be implemented by two filters that run at half clock as described below with respect to FIG. 5.

The noise shaping filter sub-block 400 may implement the method 300 for noise shaping as described above with respect to FIG. 3. That is, the noise shaping filter sub-block 400 may include a quantizer configured to reduce a bit-depth of an input signal to obtain a quantized input signal and a feedback loop configured to combine a quantization error of the quantizer with the input signal to obtain a noise-shaped output signal. The feedback loop may include a combination of a first and a second quantization stage operating at the bit-depth of the input signal and a correction stage operating at a bit-depth of the quantization error.

In an implementation of the noise shaping filter sub-block 400, the feedback loop may be configured to provide the noise-shaped output signal in a lower clock rate than the input signal. In an implementation, the noise shaping filter sub-block 400 may include a lookup table configured to implement the combination of the first quantization stage and the correction stage, e.g. a lookup table according to table 2 described above. In an implementation, the noise shaping filter sub-block 400 is configured to combine a first and a second clock sample of the input signal providing one clock sample of the noise-shaped output signal. In an implementation of the noise shaping filter sub-block 400, a bit-depth of the combination of the first and second clock samples of the input signal is by one bit larger than a bit-depth of the first or the second clock sample of the input signal.

Referring to FIG. 5, an exemplary noise shaping filter 500 including two noise shaping filter sub-blocks 507, 509 as depicted in FIG. 4 is shown.

The noise shaping filter 500 receives a first sample #1 502 and a second sample #2 504 of an input signal and provides two samples Y0 506 and Y1 508 of an output signal every clock. The input signal (x0, x1 and x2) may be in the range −2^14−1 to 2^14−1. The two samples #1 502 and #2 504 of the input signal are stored in a shift register 501 having three cells X0, X1, X2 capacity where sample #1 is stored in a first cell x1 and sample #2 is stored in a second cell X1 of the shift register 501. Each second clock, the shift register 501 is shifted by two values such that cell x1 is shifted to cell X2 and cells x1 and X1 are loaded with new input values.

In an adding stage 503, a constant value of 2 to the power of 15 is added to the outputs of the shift register 501, i.e. to the contents of the cells X0, X1 and X2 according to a range transformation from a signed representation to an unsigned representation of the input signal. The constant factor of 2^15 is added in-order to hold the "additive property". The resulting values are stored in a register 505 with three cells X0, X1, X2 capacity. In an implementation, the register 505 and the shift register 501 are realized as a single unit. The second X1 and third X2 cells of the register 505 are received as first and second sample of the input signal in a first IIR filter 507 which may correspond to the noise shaping sub-block 400 described above with respect to FIG. 4. The second X1 and first x1 cells of the register 505 are received as first and second sample of the input signal in a second IIR filter 509 which may correspond to the noise shaping sub-block 400 described above with respect to FIG. 4.

In a second adding stage 511, a constant value of 2 to the power of 12 may be added to the outputs of the IIR filters 507, 509 according to a range transformation from an unsigned representation to a signed representation of the output signal. The resulting values may be clipped in a saturation stage 513 obtaining the two output samples Y0 and Y1 in a signed representation.

The noise shaping filter 500 thus represents a noise shaping filter implementation by 2 IIR filters 507, 509 that run at half sampling rate.

The noise shaping filter 500 may implement the method 300 for noise shaping as described above with respect to FIG. 3. That is, the noise shaping filter 500 may include a first and a second noise shaping filter, each of them including a quantizer configured to reduce a bit-depth of an input signal to obtain a quantized input signal and a feedback loop configured to combine a quantization error of the quantizer with the input signal to obtain a noise-shaped output signal. The feedback loop may include a combination of a first and a second quantization stage operating at the bit-depth of the input signal and a correction stage operating at a bit-depth of the quantization error.

In an implementation of the noise shaping filter 500, the feedback loops of the first and second noise shaping filters may be configured to provide the noise-shaped output signal in a lower clock rate than the input signal. In an implementation, the noise shaping filter 500 may be configured to provide two clock samples of the noise-shaped output signal in every two clocks. In an implementation, the noise shaping filter 500 may be configured to receive two clock samples of the input signal in every clock. In an implementation of the noise shaping filter 500, the first noise shaping filter may be configured to combine a first and a second clock sample of the input signal providing a first clock sample of the noise-shaped output signal. In an implementation of the noise shaping filter 500, the second noise shaping filter may be configured to combine the second and a third clock sample of the input signal providing a second clock sample of the noise-shaped output signal. In an implementation, the noise shaping filter 500 may include a shift register configured to store the first, second and third clock samples of the input signal. In an implementation, the noise shaping filter 500 may include a bit adder configured to transform a range of the input signal to positive numbers before being processed by the first and second noise shaping filters. In an implementation, the noise shaping filter 500 may include a bit adder configured to transform a range of the input signal to negative numbers before being processed by the first and second noise shaping filters.

Referring to FIG. 6, an example of a noise shaping filter sub-block 600 in a pipeline-baseline implementation is shown, i.e. a straightforward implementation of the filtering equation (11) described above where n+1 is replaced by n.

The filter sub-block 600 receives one sample u(n) 602 of an input signal which sample 602 has a bit-depth of 16 bits and is received as unsigned value. The filter sub-block 600 provides one sample y(n) 618 of an output signal having a bit-depth of 13 bits, i.e. reduced by k=3 bits with respect to the input signal. As mentioned above, any other value for k can be realized. The value k=3 is used here as an exemplary value due to simplification reasons. A signed error signal e 614 having a bit-depth of 4 bits is fed back to an adder 601 adding the sample u(n) of the input signal to the error signal e 614 obtaining an internal value v(n) 606 which is passed through a first delay unit "D" 603 to obtain a first delayed internal value v(n−1) 608. The output signal y(n) 618 is obtained by passing the first delayed internal value v(n−1) 608 through a quantizer "Q" 611 (also denoted as round unit) performing a quantizing operation with respect to the first delayed internal value v(n−1) 608. The quantizing operation may be a bit-depth reduction or a rounding operation as described above, e.g. a bit-depth reduction by 3 bits according to Q(x)=round(x/8).

The error e 614 is obtained by passing the 3 least significant bits 612 of a second internal value 610 through a lookup table 609, e.g. a lookup table according to table 2 described below. The second internal value 610 which may be a signed value of a bit-depth of 17 bits can be obtained by subtracting a second delayed internal value v(n−2) 620 from the first sample u(n) 602 of the input signal delayed by a second delay unit "D" 613. The second delayed internal value v(n−2) 620 is obtained by passing the first delayed internal value v(n−1) 608 through a third delay unit "D" 615. An adding unit 605 with an inverse input for the second delayed internal value v(n−2) 620 can be used for implementing the subtraction. A bit shifter 607 can be used for taking the 3 least significant bits of the second internal value 610. These 3 least significant bits may represent a signed 3 bit-value 612.

The noise shaping filter sub-block 600 may reduce the bit-depth of the input signal 602 from 16 bits unsigned to 13 bits unsigned, while keeping the quantization noise at the edges near the half sampling frequency Fs/2 unchanged, with a tradeoff of increasing the quantization noise near DC frequency by about 6 dB compared to the noise level of a 13 bits unsigned signal.

The noise shaping filter sub-block 600 may implement one or both of the IIR filters 507, 509 of the noise shaping filter 500 described above with respect to FIG. 5. The noise shaping filter sub-block 600 may implement at least part of the noise shaping block 803 described below with respect to FIG. 8.

Referring to FIG. 7, an example of a noise shaping filter sub-block 700 in a pipeline-modified implementation is shown. The delay blocks 613, 615 depicted in FIG. 6 are moved in such a way that the number of calculations on the critical path 717 is reduced.

The filter sub-block 700 receives one sample u(n) 702 of an input signal which sample 702 has a bit-depth of 16 bits and is received as unsigned value. The filter sub-block 700 provides one sample y(n) 718 of an output signal having a bit-depth of 13 bits, i.e. reduced by k=3 bits with respect to the input signal. As mentioned above, any other value for k can be realized. The value k=3 is used here as an exemplary value due to simplification reasons. A signed error signal e 714 having a bit-depth of 4 bits is delayed by a second delay unit "D" 715 and fed back to an adder 701 adding the sample u(n) of the input signal to the delayed error signal obtaining an internal value v(n) 706 which is passed through a first delay unit "D" 703 to obtain a delayed internal value v(n−1) 708. The output signal y(n) 718 is obtained by passing the delayed internal value v(n−1) 708 through a quantizer "Q" 711 (also denoted as round unit) performing a quantizing operation with respect to the delayed internal value v(n−1) 708. The quantizing operation may be a bit-depth reduction or a rounding operation as described above, e.g. a bit-depth reduction by 3 bits according to Q(x)=round(x/8).

The error e 714 is obtained by passing the 3 least significant bits 712 of a second internal value 710 through a lookup table 709, e.g. a lookup table according to table 2 described below. The second internal value 710 which may be a signed value of a bit-depth of 17 bits can be obtained by subtracting the delayed internal value v(n−1) 708 from the first sample u(n) 702 of the input signal. An adding unit 705 with an inverse input for the delayed internal value v(n−1) 708 can be used for implementing the subtraction. A bit shifter 707 can be used for taking the 3 least significant bits of the second internal value 710. These 3 least significant bits may represent a signed 3 bit-value 712. The noise shaping filter sub-block 700 may reduce the bit-depth of the input signal 702 from 16 bits unsigned to 13 bits unsigned, while keeping the quantization noise at the edges near the half sampling frequency Fs/2 unchanged, with a tradeoff of increasing the quantization noise near DC frequency by about 6 dB compared to the noise level of a 13 bits unsigned signal. The noise shaping filter sub-block 700 may implement one or both of the IIR filters 507, 509 of the noise shaping filter 500 described above with respect to FIG. 5. The noise shaping filter sub-block 700 may implement at least part of the noise shaping block 803 described below with respect to FIG. 8.

Figure 8:
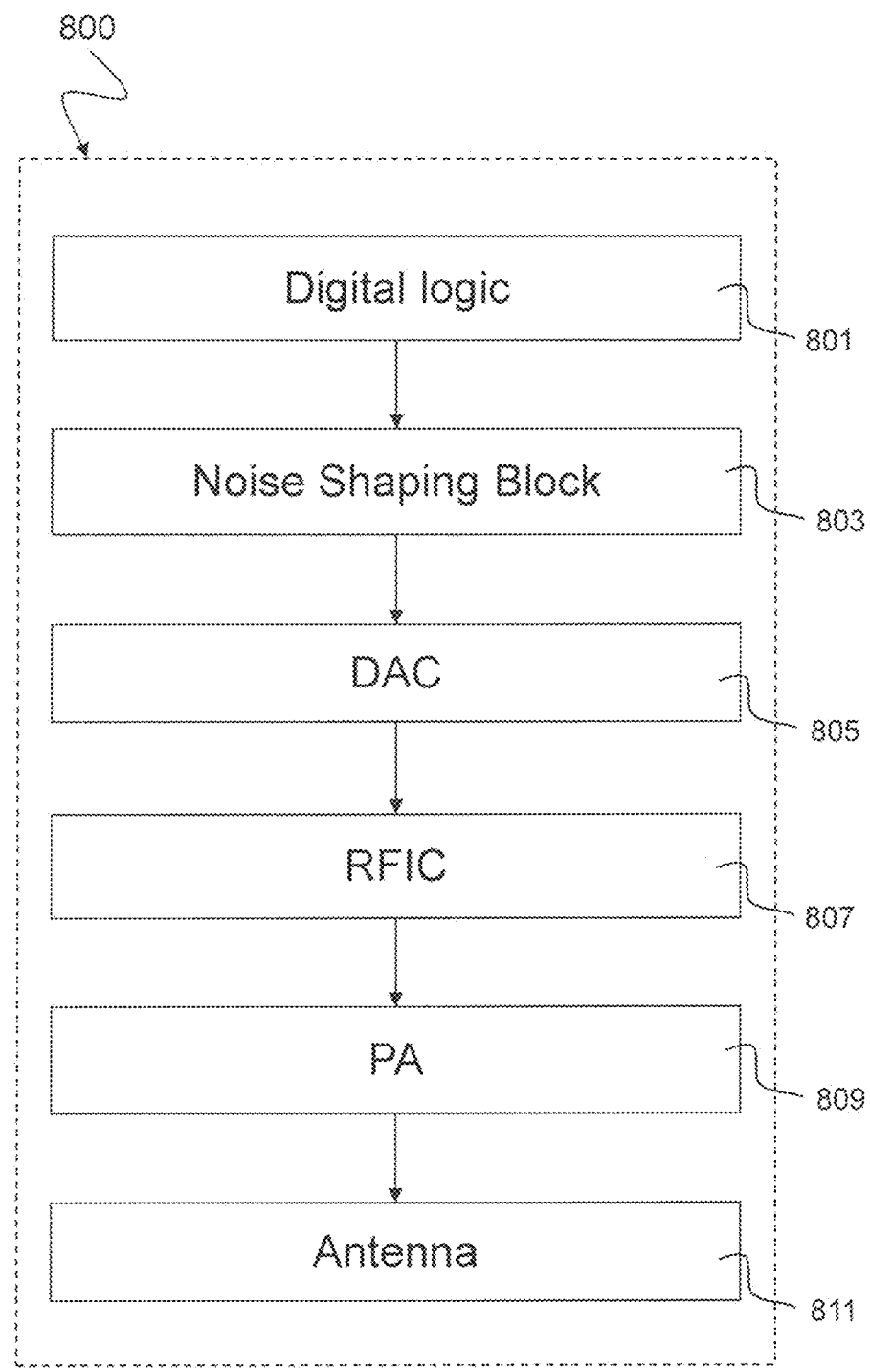
FIG. 8 illustrates an exemplary noise shaper 800 including a noise shaping filter block 803 as depicted in FIG. 5.

Referring to FIG. 8, an exemplary noise shaper 800 including a noise shaping filter block 500 as depicted in FIG. 5 is shown. A signal that may be generated by a digital logic block 801 is noise shaped in a noise shaping block. The noise shaping may correspond to the noise shaping as described above with respect to FIG. 1. The noise shaping block 803 may be implemented by a noise shaping filter 500 as described above with respect to FIG. 5. The noise shaped signal passes a digital-analog converter (DAC) 805, a radio frequency integrated circuit (RFIC) 807 and a power amplifier (PA) 809 before being transmitted by an antenna 811.

Figure 9:
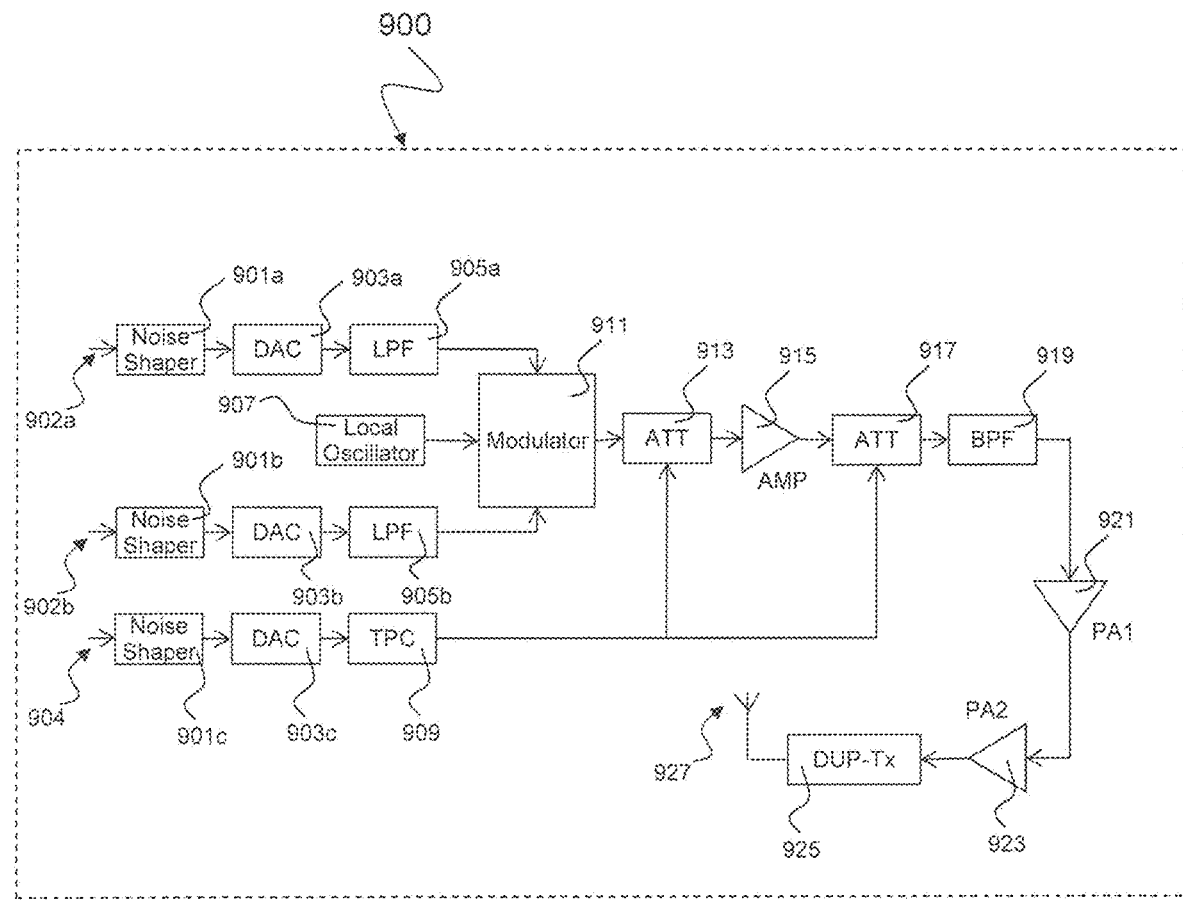
FIG. 9 illustrates an exemplary block diagram of a transmitter part 900 of a mobile device.

Referring to FIG. 9, a block diagram of an exemplary transmitter 900 of a mobile device is shown. The transmitter 900 may support the uplink of a radio communications system, e.g. a W-CDMA system. The transmitter 900 may provide a digital interface for the baseband processor (not depicted in FIG. 9). The baseband processor may send the spread baseband signal 902a, 902b through the digital interface to the transmitter 900. The transmitter 900 may modulate the baseband signals 902a, 902b on a radio frequency (RF) carrier by using a modulator 911 which may be controlled by a local oscillator 907. The modulated RF signal 906 may then be amplified 915, 921, 923 filtered 919 and transmitted to the base station through the air link 927. To combat the near-far problem, the transmitter 900 may operate in conjunction with a transmit power control (TPC) 909 to maintain the transmit power at an appropriate level. The control determines the power level based on the digital command 904 from the baseband processor. The transmit power control 909 may adjust the transmit power by controlling attenuation of two attenuators 913, 917 arranged before and after an amplifier 921 configured to amplify the modulated RF signal 906. Two exemplary power amplifiers 921, 923 may be used to boost the modulated RF signal 906 after transmit power control 913, 915, 917 and bandpass filtering 919 to the antenna 927.

Before being modulated, the baseband signal 902a, 902b may be noise shaped by a noise shaper 901a, 901b and digital-to-analog converted by a digital-to-analog converter DAC 903a, 903b. The noise shaper 901a, 901b may correspond to any one of the noise shapers described above with respect to FIGS. 1, 5 and 8. The DAC 903a, 903b provides the interface between the baseband processor and the transmitter. It accepts the I and Q baseband signals in digital format from the baseband processor and outputs the I and Q signals in analog form to the modulator 911. The digital command 904 from the baseband processor may be noise shaped by a noise shaper 901c and digital-to-analog converted by a digital-to-analog converter DAC 903c. The noise shaper 901c may correspond to any one of the noise shapers described above with respect to FIGS. 1, 5 and 8. A duplexer 925 may be used to allow the mobile phone to simultaneously transmit and receive on a single antenna 927. The duplexer 925 may be implemented as a three-port filter device including transmitting bandpass filter and receiving bandpass filter.

EXAMPLES

The following examples pertain to further embodiments. Example 1 is a method for noise shaping, the method comprising: reducing a bit-depth of an input signal to obtain a quantized input signal; feeding a quantization error corresponding to the bit-depth reduction of the input signal into a feedback loop to the input signal, the feedback loop comprising a first quantization stage, a second quantization stage and a correction stage, both the first and second quantization stages operating at the bit-depth of the input signal and the correction stage operating at a bit-depth of the quantization error; and generating a noise-shaped output signal at lower clock rate than the input signal based on the feedback loop.

In Example 2, the subject matter of Example 1 can optionally include that a bit-depth reduction of the first quantization stage corresponds to a bit-depth reduction of the second quantization stage.

In Example 3, the subject matter of any one of Examples 1-2 can optionally include reducing a bit-depth of an input to the first quantization stage to a bit-depth of the quantization error when passing the input through the first quantization stage.

In Example 4, the subject matter of any one of Examples 1-3 can optionally include that an input to the first quantization stage corresponds to an input to the correction stage.

In Example 5, the subject matter of any one of Examples 1-4 can optionally include that an input to the second quantization stage is different from an input to the correction stage.

In Example 6, the subject matter of any one of Examples 1-5 can optionally include using an additive property for the combination of the first and second quantization stages and the correction stage.

In Example 7, the subject matter of Example 6 can optionally include that the additive property is according to the following:

$$Q(a1+Q(a2))=Q(a1)+Q(a2)+\text{delta}(a1),$$

where Q(a1) denotes the first quantization stage, Q(a2) denotes the second quantization stage, delta(a1) denotes the correction stage, a1 denotes an input to both the first quantization stage and the correction stage and a2 denotes an input to the second quantization stage.

In Example 8, the subject matter of any one of Examples 1-7 can optionally include that the correction stage outputs a one if an input to the correction stage is smaller than zero and a fractional part of that input corresponds to two to the half bit-depth of the quantization error and otherwise outputs a zero.

In Example 9, the subject matter of Example 8 can optionally include determining the fractional part of the input of the correction stage by applying a modulo operation to the input of the correction stage, the modulo operation with respect to two to the bit-depth of the quantization error.

In Example 10, the subject matter of any one of Examples 1-9 can optionally include implementing the combination of the first quantization stage and the correction stage based on a lookup table.

In Example 11, the subject matter of Example 10 can optionally include that a size of the lookup table corresponds to two to a bit-depth of the quantization error.

In Example 12, the subject matter of Example 10 can optionally include that a bit-depth of an output of the lookup table is by one bit greater than a bit-depth of an input to the lookup table.

In Example 13, the subject matter of any one of Examples 1-12 can optionally include that the feedback loop comprises a filtering of the quantization error with filter coefficients whose real and imaginary parts are integers.

Example 14 is a noise shaping filter, comprising: a quantizer configured to reduce a bit-depth of an input signal to obtain a quantized input signal; and a feedback loop configured to combine a quantization error of the quantizer with the input signal to obtain a noise-shaped output signal, wherein the feedback loop comprises a combination of a first and a second quantization stage operating at the bit-depth of the input signal and a correction stage operating at a bit-depth of the quantization error.

In Example 15, the subject matter of Example 14 can optionally include that the feedback loop is configured to provide the noise-shaped output signal in a lower clock rate than the input signal.

In Example 16, the subject matter of any one of Examples 14-15 can optionally include a lookup table configured to implement the combination of the first quantization stage and the correction stage.

In Example 17, the subject matter of Example 16 can optionally include that the noise shaping filter is configured to combine a first and a second clock sample of the input signal providing one clock sample of the noise-shaped output signal.

In Example 18, the subject matter of Example 17 can optionally include that a bit-depth of the combination of the first and second clock samples of the input signal is by one bit larger than a bit-depth of the first or the second clock sample of the input signal.

Example 19 is a noise shaper, comprising: a first and a second noise shaping filter, each of them comprising: a quantizer configured to reduce a bit-depth of an input signal to obtain a quantized input signal; a feedback loop configured to combine a quantization error of the quantizer with the input signal to obtain a noise-shaped output signal, wherein the feedback loop comprises a combination of a first and a second quantization stage operating at the bit-depth of the input signal and a correction stage operating at a bit-depth of the quantization error.

In Example 20, the subject matter of Example 19 can optionally include that the feedback loops of the first and second noise shaping filters are configured to provide the noise-shaped output signal in a lower clock rate than the input signal.

In Example 21, the subject matter of any one of Examples 19-20 can optionally include that the noise shaper is configured to provide two clock samples of the noise-shaped output signal in every two clocks.

In Example 22, the subject matter of any one of Examples 19-21 can optionally include that the noise shaper is configured to receive two clock samples of the input signal in every clock.

In Example 23, the subject matter of any one of Examples 19-22 can optionally include that the first noise shaping filter is configured to combine a first and a second clock sample of the input signal providing a first clock sample of the noise-shaped output signal; and that the second noise shaping filter is configured to combine the second and a third clock sample of the input signal providing a second clock sample of the noise-shaped output signal.

In Example 24, the subject matter of Example 23 can optionally include that the noise shaper comprises a shift register configured to store the first, second and third clock samples of the input signal.

In Example 25, the subject matter of Example 23 can optionally include a bit adder configured to transform a range of the input signal to positive numbers or to negative numbers before being processed by the first and second noise shaping filters.

Example 26 is a noise shaping device, comprising: a first unit configured to reduce a bit-depth of an input signal to obtain a quantized input signal; a second unit configured to feed a quantization error corresponding to the bit-depth reduction of the input signal into a feedback loop to the input signal, the feedback loop comprising a first quantization stage, a second quantization stage and a correction stage, both the first and second quantization stages operating at the bit-depth of the input signal and the correction stage operating at a bit-depth of the quantization error; and a third unit configured to generate a noise-shaped output signal at lower clock rate than the input signal based on the feedback loop.

In Example 27, the subject matter of Example 26 can optionally include that a bit-depth reduction of the first quantization stage corresponds to a bit-depth reduction of the second quantization stage.

In Example 28, the subject matter of any one of Examples 26-27 can optionally include a fourth unit configured to reduce a bit-depth of an input to the first quantization stage to a bit-depth of the quantization error when passing the input through the first quantization stage.

In Example 29, the subject matter of any one of Examples 26-28 can optionally include that an input to the first quantization stage corresponds to an input to the correction stage.

In Example 30, the subject matter of any one of Examples 26-29 can optionally include that an input to the second quantization stage is different from an input to the correction stage.

In Example 31, the subject matter of any one of Examples 26-30 can optionally include a fifth unit configured to use an additive property for the combination of the first and second quantization stages and the correction stage.

In Example 32, the subject matter of Example 31 can optionally include that the additive property is according to the following:

$$Q(a1+Q(a2))=Q(a1)+Q(a2)+\text{delta}(a1),$$

where $Q(a1)$ denotes the first quantization stage, $Q(a2)$ denotes the second quantization stage, $\text{delta}(a1)$ denotes the correction stage, $a1$ denotes an input to both the first quantization stage and the correction stage and $a2$ denotes an input to the second quantization stage.

In Example 33, the subject matter of any one of Examples 26-32 can optionally include that the correction stage outputs a one if an input to the correction stage is smaller than zero and a fractional part of that input corresponds to two to the half bit-depth of the quantization error and otherwise outputs a zero.

In Example 34, the subject matter of Example 33 can optionally include a sixth unit configured to determine the fractional part of the input of the correction stage by applying a modulo operation to the input of the correction stage, the modulo operation with respect to two to the bit-depth of the quantization error.

In Example 35, the subject matter of Example 26 can optionally include a lookup table configured to implement the combination of the first quantization stage and the correction stage.

In Example 36, the subject matter of Example 26 can optionally include a seventh unit configured to implement the combination of the first quantization stage and the correction stage based on a lookup table.

In Example 37, the subject matter of any one of Examples 35-36 can optionally include that a size of the lookup table corresponds to two to a bit-depth of the quantization error.

In Example 38, the subject matter of any one of Examples 35-36 can optionally include that a bit-depth of an output of the lookup table is by one bit greater than a bit-depth of an input to the lookup table.

In Example 39, the subject matter of any one of Examples 26-38 can optionally include that the feedback loop comprises a filtering of the quantization error with filter coefficients whose real and imaginary parts are integers.

Example 40 is a noise shaping device, comprising: means for reducing a bit-depth of an input signal to obtain a quantized input signal; means for feeding a quantization error corresponding to the bit-depth reduction of the input signal into a feedback loop to the input signal, the feedback loop comprising a first quantization stage, a second quantization stage and a correction stage, both the first and second quantization stages operating at the bit-depth of the input signal and the correction stage operating at a bit-depth of the quantization error; and means for generating a noise-shaped output signal at lower clock rate than the input signal based on the feedback loop.

In Example 41, the subject matter of Example 40 can optionally include that a bit-depth reduction of the first quantization stage corresponds to a bit-depth reduction of the second quantization stage.

In Example 42, the subject matter of any one of Examples 40-41 can optionally include means for reducing a bit-depth of an input to the first quantization stage to a bit-depth of the quantization error when passing the input through the first quantization stage.

In Example 43, the subject matter of any one of Examples 40-42 can optionally include that an input to the first quantization stage corresponds to an input to the correction stage.

In Example 44, the subject matter of any one of Examples 40-43 can optionally include that an input to the second quantization stage is different from an input to the correction stage.

In Example 45, the subject matter of any one of Examples 40-44 can optionally include means for using an additive property for the combination of the first and second quantization stages and the correction stage.

In Example 46, the subject matter of Examples 45 can optionally include that the additive property is according to the following:

$$Q(a1+Q(a2))=Q(a1)+Q(a2)+\text{delta}(a1),$$

where Q(a1) denotes the first quantization stage, Q(a2) denotes the second quantization stage, delta(a1) denotes the correction stage, a1 denotes an input to both the first quantization stage and the correction stage and a2 denotes an input to the second quantization stage.

In Example 47, the subject matter of any one of Examples 40-46 can optionally include that the correction stage outputs a one if an input to the correction stage is smaller than zero and a fractional part of that input corresponds to two to the half bit-depth of the quantization error and otherwise outputs a zero.

In Example 48, the subject matter of Example 47 can optionally include means for determining the fractional part of the input of the correction stage by applying a modulo operation to the input of the correction stage, the modulo operation with respect to two to the bit-depth of the quantization error.

In Example 49, the subject matter of Example 40 can optionally include means for implementing the combination of the first quantization stage and the correction stage.

In Example 50, the subject matter of any one of Examples 40-49 can optionally include means for implementing the combination of the first quantization stage and the correction stage based on a lookup table.

In Example 51, the subject matter of Example 50 can optionally include that a size of the lookup table corresponds to two to a bit-depth of the quantization error.

In Example 52, the subject matter of Example 50 can optionally include that a bit-depth of an output of the lookup table is by one bit greater than a bit-depth of an input to the lookup table.

In Example 53, the subject matter of any one of Examples 40-52 can optionally include that the feedback loop comprises a filtering of the quantization error with filter coefficients whose real and imaginary parts are integers.

Example 54 is a noise shaping filter, comprising: means for reducing a bit-depth of an input signal to obtain a quantized input signal; and feedback means for combining a quantization error of the quantizer with the input signal to obtain a noise-shaped output signal, wherein the feedback means comprises a combination of a first and a second quantization stage operating at the bit-depth of the input signal and a correction stage operating at a bit-depth of the quantization error.

In Example 55, the subject matter of Example 54 can optionally include that the feedback means is configured to provide the noise-shaped output signal in a lower clock rate than the input signal.

In Example 56, the subject matter of any one of Examples 54-55 can optionally include lookup table means for implementing the combination of the first quantization stage and the correction stage.

In Example 57, the subject matter of Example 56 can optionally include that the noise shaping filter is configured to combine a first and a second clock sample of the input signal providing one clock sample of the noise-shaped output signal.

In Example 58, the subject matter of Example 57 can optionally include that a bit-depth of the combination of the first and second clock samples of the input signal is by one bit larger than a bit-depth of the first or the second clock sample of the input signal.

Example 59 is a noise shaper, comprising: first and second filtering means for noise shaping, each of them comprising: means for to reducing a bit-depth of an input signal to obtain a quantized input signal; feedback means configured to combine a quantization error of the means for reducing a bit-depth with the input signal to obtain a noise-shaped output signal, wherein the feedback means comprises a combination of a first and a second quantization stage operating at the bit-depth of the input signal and a correction stage operating at a bit-depth of the quantization error.

In Example 60, the subject matter of Example 59 can optionally include that the feedback means of the first and second filtering means for noise shaping are configured to provide the noise-shaped output signal in a lower clock rate than the input signal.

In Example 61, the subject matter of any one of Examples 59-60 can optionally include that the noise shaper is configured to provide two clock samples of the noise-shaped output signal in every two clocks.

In Example 62, the subject matter of any one of Examples 59-61 can optionally include that the noise shaper is configured to receive two clock samples of the input signal in every clock.

In Example 63, the subject matter of any one of Examples 59-62 can optionally include that the first filtering means is configured to combine a first and a second clock sample of the input signal providing a first clock sample of the noise-shaped output signal; and that the second filtering means is configured to combine the second and a third clock sample of the input signal providing a second clock sample of the noise-shaped output signal.

In Example 64, the subject matter of any one of Examples 59-63 can optionally include means for storing the first, second and third clock samples of the input signal.

In Example 65, the subject matter of Example 63 can optionally include means for transforming a range of the input signal to positive numbers or to negative numbers before being processed by the first and second filtering means.

Example 66 is a computer readable medium on which computer instructions are stored which when executed by a computer, cause the computer to perform the method of any one of Examples 1 to 13.

In Example 67, the subject matter of any one of Examples 19-25 can optionally include a digital logic unit configured to provide the first and second noise shaping filters with the input signal.

In Example 68, the subject matter of Example 67 can optionally include a digital-to-analog converter configured to convert the noise-shaped output signal into an analog output signal.

In Example 69, the subject matter of Example 68 can optionally include a radio frequency integrated circuit configured to modulate the analog output signal providing a modulated analog output signal.

In Example 70, the subject matter of Example 69 can optionally include a power amplifier configured to amplify the modulated analog output signal providing an antenna output signal.

In Example 71, the subject matter of Example 70 can optionally include an antenna configured to radiate the antenna output signal.

In Example 72, the subject matter of Example 71 can optionally include that the antenna comprises a MIMO antenna array.

Example 73 is a transceiver system, comprising a noise shaper according to any of the Examples 19 to 30 and a receiver configured to receive a signal based on the noise shaped output signal.

Example 74 is a method for noise shaping, the method comprising: quantizing an input signal to obtain a quantized input signal; feeding a quantization error of the quantizing into a feedback loop to the input signal, the feedback loop comprising a first quantization stage, a second quantization stage and a correction stage, both the first and second quantization stages operating at a resolution of the input signal and the correction stage operating at a resolution of the quantization error; and generating a noise-shaped output signal at lower clock rate than the input signal based on the feedback loop.

In Example 75, the subject matter of Example 74 can optionally include that a quantization of the first quantization stage corresponds to a quantization of the second quantization stage.

In Example 76, the subject matter of any one of Examples 74-75 can optionally include quantizing an input to the first quantization stage to a resolution of the quantization error when passing the input through the first quantization stage.

In Example 77, the subject matter of any one of Examples 74-76 can optionally include that an input to the first quantization stage corresponds to an input to the correction stage.

In Example 78, the subject matter of any one of Examples 74-77 can optionally include that an input to the second quantization stage is different from an input to the correction stage.

In Example 79, the subject matter of any one of Examples 74-78 can optionally include using an additive property for the combination of the first and second quantization stages and the correction stage.

In Example 80, the subject matter of Examples 79 can optionally include that the additive property is according to the following:

$$Q(a1+Q(a2))=Q(a1)+Q(a2)+\text{delta}(a1),$$

where $Q(a1)$ denotes the first quantization stage, $Q(a2)$ denotes the second quantization stage, $\text{delta}(a1)$ denotes the correction stage, a1 denotes an input to both the first quantization stage and the correction stage and a2 denotes an input to the second quantization stage.

In Example 81, the subject matter of any one of Examples 74-80 can optionally include that the correction stage outputs a one if an input to the correction stage is smaller than zero and a fractional part of that input corresponds to two to the half resolution of the quantization error and otherwise outputs a zero.

In Example 82, the subject matter of Example 81 can optionally include determining the fractional part of the input of the correction stage by applying a modulo operation to the input of the correction stage, the modulo operation with respect to two to the resolution of the quantization error.

In Example 83, the subject matter of any one of Examples 74-82 can optionally include that the correction stage outputs a one if an input to the correction stage is smaller than zero and a fractional part of that input corresponds to two to the half bit-depth of the quantization error and otherwise outputs a zero.

In Example 84, the subject matter of Example 83 can optionally include determining the fractional part of the input of the correction stage by applying a modulo operation to the input of the correction stage, the modulo operation with respect to two to the bit-depth of the quantization error.

In Example 85, the subject matter of any one of Examples 74-84 can optionally include implementing the combination of the first quantization stage and the correction stage based on a lookup table.

In Example 86, the subject matter of Example 85 can optionally include that a size of the lookup table corresponds to two to a bit-depth of the quantization error.

In Example 87, the subject matter of Example 85 can optionally include that a bit-depth of an output of the lookup table is by one bit greater than a bit-depth of an input to the lookup table.

In Example 88, the subject matter of any one of Examples 74-87 can optionally include that the feedback loop comprises a filtering of the quantization error with filter coefficients whose real and imaginary parts are integers.

In Example 89 is a mobile device, comprising: a baseband processor configured to provide a baseband signal; and a transmitter configured to modulate the baseband signal on a radio frequency carrier and to transmit the modulated baseband signal through an air link to a base station, wherein the transmitter comprises a noise shaper configured to noise-shape the baseband signal, the noise shaper comprising: a first and a second noise shaping filter, each of them comprising: a quantizer configured to reduce a bit-depth of the baseband signal to obtain a quantized baseband signal; a feedback loop configured to combine a quantization error of the quantizer with the baseband signal to obtain a noise-shaped baseband signal, wherein the feedback loop comprises a combination of a first and a second quantization stage operating at the bit-depth of the baseband signal and a correction stage operating at a bit-depth of the quantization error.

In Example 90, the subject matter of Examples 89 can optionally include that the transmitter further comprises a digital-to-analog converter configured to convert the noise-shaped baseband signal to an analog baseband signal; and a modulator configured to modulate the analog baseband signal to the radio frequency carrier.

While the disclosure has been illustrated and described with respect to one or more implementations, alterations and/or modifications may be made to the illustrated examples described above. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure.

What is claimed is:

1. A method for noise shaping, the method comprising:
  reducing a bit-depth of an input signal to obtain a quantized input signal;
  feeding a quantization error corresponding to the bit-depth reduction of the input signal into a feedback loop to the input signal, the feedback loop comprising a first quantization stage, a second quantization stage and a correction stage, both the first and second quantization stages operating at the bit-depth of the input signal and the correction stage operating at a bit-depth of the quantization error; and
  generating a noise-shaped output signal at lower clock rate than the input signal based on the feedback loop.

2. The method of claim 1, wherein a bit-depth reduction of the first quantization stage corresponds to a bit-depth reduction of the second quantization stage.

3. The method of claim 1, comprising:
  reducing a bit-depth of an input to the first quantization stage to a bit-depth of the quantization error when passing the input through the first quantization stage.

4. The method of claim 1, wherein an input to the first quantization stage corresponds to an input to the correction stage.

5. The method of claim 1, wherein an input to the second quantization stage is different from an input to the correction stage.

6. The method of claim 1, comprising:
  using an additive property for the combination of the first and second quantization stages and the correction stage.

7. The method of claim 6, wherein the additive property is according to the following:

$$Q(a1+Q(a2))=Q(a1)+Q(a2)+\text{delta}(a1),$$

where $Q(a1)$ denotes the first quantization stage, $Q(a2)$ denotes the second quantization stage, $\text{delta}(a1)$ denotes the correction stage, $a1$ denotes an input to both the first quantization stage and the correction stage and $a2$ denotes an input to the second quantization stage.

8. The method of claim 1, wherein the correction stage outputs a one if an input to the correction stage is smaller than zero and a fractional part of that input corresponds to two to the half bit-depth of the quantization error and otherwise outputs a zero.

9. The method of claim 8, comprising:
  determining the fractional part of the input of the correction stage by applying a modulo operation to the input of the correction stage, the modulo operation with respect to two to the bit-depth of the quantization error.

10. The method of claim 1, comprising:
  implementing the combination of the first quantization stage and the correction stage based on a lookup table.

11. The method of claim 10, wherein a size of the lookup table corresponds to two to a bit-depth of the quantization error.

12. The method of claim 10, wherein a bit-depth of an output of the lookup table is by one bit greater than a bit-depth of an input to the lookup table.

13. The method of claim 1, wherein the feedback loop comprises a filtering of the quantization error with filter coefficients whose real and imaginary parts are integers.

14. A noise shaping filter, comprising:
  a quantizer circuit configured to reduce a bit-depth of an input signal to obtain a quantized input signal;
  a feedback loop circuit configured to combine a quantization error of the quantizer with the input signal to obtain a noise-shaped output signal,
  wherein the feedback loop circuit comprises a combination of a first and a second quantization stage operating at the bit-depth of the input signal and a correction stage operating at a bit-depth of the quantization error.

15. The noise shaping filter of claim 14, wherein the feedback loop circuit is configured to provide the noise-shaped output signal in a lower clock rate than the input signal.

16. The noise shaping filter of claim 14, comprising a lookup table configured to implement the combination of the first quantization stage and the correction stage.

17. The noise shaping filter of claim 16, configured to combine a first and a second clock sample of the input signal providing one clock sample of the noise-shaped output signal.

18. The noise shaping filter of claim 17, wherein a bit-depth of the combination of the first and second clock samples of the input signal is by one bit larger than a bit-depth of the first or the second clock sample of the input signal.

19. A noise shaper, comprising:
  a first and a second noise shaping filter circuit, each of them comprising:
    a quantizer circuit configured to reduce a bit-depth of an input signal to obtain a quantized input signal;
    a feedback loop circuit configured to combine a quantization error of the quantizer circuit with the input signal to obtain a noise-shaped output signal,
    wherein the feedback loop circuit comprises a combination of a first and a second quantization stage operating at the bit-depth of the input signal and a correction stage operating at a bit-depth of the quantization error.

20. The noise shaper of claim 19, wherein the feedback loop circuits of the first and second noise shaping filters are configured to provide the noise-shaped output signal in a lower clock rate than the input signal.

21. The noise shaper of claim 19, configured to provide two clock samples of the noise-shaped output signal in every two clocks.

22. The noise shaper of claim 19, configured to receive two clock samples of the input signal in every clock.

23. The noise shaper of claim 19,
  wherein the first noise shaping filter circuit is configured to combine a first and a second clock sample of the input signal providing a first clock sample of the noise-shaped output signal; and wherein the second noise shaping filter circuit is configured to combine the second and a third clock sample of the input signal providing a second clock sample of the noise-shaped output signal.

24. The noise shaper of claim 23, comprising a shift register configured to store the first, second and third clock samples of the input signal.

25. The noise shaper of claim 23, comprising a bit adder configured to transform a range of the input signal to positive numbers or to negative numbers before being processed by the first and second noise shaping filters.

26. A mobile device, comprising:
- a baseband processor configured to provide a baseband signal; and
- a transmitter configured to modulate the baseband signal on a radio frequency carrier and to transmit the modulated baseband signal through an air link to a base station,
- wherein the transmitter comprises a noise shaper configured to noise-shape the baseband signal, the noise shaper comprising:
  - a first and a second noise shaping filter, each of them comprising:
    - a quantizer configured to reduce a bit-depth of the baseband signal to obtain a quantized baseband signal;
    - a feedback loop configured to combine a quantization error of the quantizer with the baseband signal to obtain a noise-shaped baseband signal,
    - wherein the feedback loop comprises a combination of a first and a second quantization stage operating at the bit-depth of the baseband signal and a correction stage operating at a bit-depth of the quantization error.

27. The mobile device of claim 26, wherein the transmitter further comprises:
- a digital-to-analog converter configured to convert the noise-shaped baseband signal to an analog baseband signal; and
- a modulator configured to modulate the analog baseband signal to the radio frequency carrier.

* * * * *